United States Patent [19]

Swart

[11] Patent Number: 4,845,377

[45] Date of Patent: Jul. 4, 1989

[54] CIRCUIT ARRANGEMENT FOR THE ACTUATION OF A SAFETY SYSTEM

[76] Inventor: Marten Swart, Albr.-Altdorfer-Ring 70, 8407 Obertraubling, Fed. Rep. of Germany

[21] Appl. No.: 169,051

[22] Filed: Mar. 16, 1988

[30] Foreign Application Priority Data

Mar. 26, 1987 [DE] Fed. Rep. of Germany ....... 3709892

[51] Int. Cl.[4] ............................................. G08B 29/00
[52] U.S. Cl. ................................. 307/10.1; 340/436; 280/735
[58] Field of Search ......................... 307/10 R, 105 B; 340/52 R, 52 E, 52 H; 180/268, 270, 271, 272, 273, 282, 283, 274, 287; 280/734, 735, 736

[56] References Cited

U.S. PATENT DOCUMENTS

| 3,622,974 | 11/1971 | Best | 280/735 X |
|---|---|---|---|
| 3,629,816 | 12/1971 | Gillund | 280/735 X |
| 3,701,903 | 10/1972 | Merhar | 340/52 H X |
| 3,849,759 | 11/1974 | Hosaka et al. | 340/52 R |
| 3,851,305 | 11/1974 | Baba et al. | 340/52 H |
| 3,863,208 | 1/1975 | Balban | 340/52 H |
| 3,890,054 | 6/1975 | Hosaka et al. | 340/52 H |
| 3,949,357 | 4/1976 | Hosaka | 340/52 H |
| 4,059,822 | 11/1977 | Toshioka et al. | 340/52 H |
| 4,158,191 | 6/1979 | Rogers et al. | 340/52 H |
| 4,243,971 | 1/1981 | Suchowerskyj et al. | 340/52 H |

FOREIGN PATENT DOCUMENTS 2813457  11/1979  Fed. Rep. of Germany .

Primary Examiner—William M. Shoop, Jr.
Assistant Examiner—Paul Ip

[57] ABSTRACT

By way of an energy source, switches controlled by delay sensors activate a logic component. Dependent on the switch positions of the switches, of a seat switch and of a seat belt switch, the logic component controls an electronic ignition switch that connects a trigger for actuating a motor vehicle air bag system.

3 Claims, 2 Drawing Sheets

CIRCUIT ARRANGEMENT FOR THE ACTUATION OF A SAFETY SYSTEM

CROSS REFERENCE TO RELATED APPLICATION

This application is related to application Ser. No. 167,130, filed Mar. 11, 1988.

BACKGROUND OF THE INVENTION

1. Field of the Invention

The present invention relates to a circuit arrangement for actuating a safety system, particularly an airbag system which comprises an energy source for at least one load circuit having a trigger for the safety system, a respective lead-through capacitor in the lead-in and lead-out of the trigger, and at least two series-connected switches each driven by a mechanical delay sensor.

2. Description of the Prior Art

Such a circuit arrangement, particularly for a motor vehicle air bag system, usually comprises a common energy source that supplies the ignition energy for load circuits having electrically-actuated triggers for the individual airbags. The actuation occurs by way of two switches connected in series with one another, whereby one of the switches is connected between the respective trigger and the energy source and the other switch is connected between the trigger and ground. These two switches are actuated by two delay sensors acting independently of one another, so that a triggering of the air bag system only occurs given response of both delay sensors. What is referred to as the two-air criterion is established by the arrangement preceding and following the respective trigger. The mistriggering, accordingly, is only possible when two errors occur simultaneously. A mistriggering is caused only by two shorts to the supply voltage and to ground or one short and a simultaneous, faulty response of only one delay sensor. Such a circuit arrangement is disclosed, for example, in the German application No. 37 05 867.

The electrically-actuated trigger for each air bag is accommodated in an air bag housing together therewith and along with further mechanical components. An electrical lead-in and lead-out for the trigger, that are connected to the two switches, lead into this air bag housing. Since the lead-in and lead-out must be respectively freely laid over a certain path length in the motor vehicle, high-frequency disturbances can be picked up on these lines. High-briefly appearing voltage and current peaks arising as a result thereof could lead to a mistriggering of the trigger. For this purpose, a lead-through capacitor that has one side connected to the housing ground and, therefore, dissipates high-frequency disturbances to ground, is therefore respectively provided in the lead-in and lead-out upon passage through the air bag housing.

Despite the presence of such lead-through capacitors, measurements with all possible operating and error conditions nonetheless repeatedly yielded current flows via the respective trigger by which it can be stressed. Such triggers, in particular, are electrically-actuated, chemical ignition wafers having a chemical propellant charge in which chemical reactions are initiated by each electrical current flow.

The present invention is based on the perception that such a current flow is caused by switch bounce or chatter of the switch at the supply voltage side for triggering the air bag. Such a switch bounce or chatter, for example, is possible given extremely hard breaking. However, the air bag is not yet triggered as a result thereof since the second switch at the ground side would also have to be closed for that purpose. The switch bounce or chatter, however, leads to a charging of the lead-through capacitors preceding and following the trigger. Since the lead-through capacitors lie on the order of magnitude of a nanofarad, this current is not sufficiently high enough to actuate the trigger.

Since the lead-through capacitors, however, themselves exercise a protective effect, they cannot be eliminated.

SUMMARY OF THE INVENTION

It is therefore the object of the invention to provide a circuit arrangement for the actuation of a safety system such that no current flow whatsoever arises via one of the triggers in the standby case of the circuit arrangement.

The above object is achieved, according to the present invention, in a circuit arrangement for actuating a safety system, particularly an air bag system, which comprises an energy source for at least one load circuit having a trigger for the safety system, a respective lead-through capacitor in the lead-in and lead-out of the trigger, and at least two, series-connected switches each driven by a mechanical delay sensor, and is particularly characterized in that the switches connect a logic component to the energy source, and in that the load circuit contains an electronic ignition switch for the trigger that is driven by the logic component.

A particular feature of the invention is characterized in that the logic component drives the electronic ignition switch dependent on the switch positions of the switches and on the switch positions of at least one status switch.

Another feature of the invention is particularly characterized in that at least one second electronic ignition switch is connected in series with the trigger switch.

In accordance therewith, the trigger is actuated via an electronic ignition switch wherein no switch bounce or chatter can occur. The drive of the electronic ignition switch is assumed by a logic component. The two switches, in turn, control the logic component and are connected thereto such that the logic component is only activated when both switches are closed.

Such a circuit arrangement is also well-suited for safety systems having a greater plurality of triggers connected in parallel. The switch contacts of the two switches thereby only carry a low control current for the logic component in the case of the trigger instead of the high trigger current.

A further advantage of the component employed in the present invention is the possibility of integrating further logic functions therein. An example of this is safety systems in which the air bag is triggered dependent on two different delay values and on the position of status switches, whereby the position of the status switches depends upon whether the seat is occupied and whether the seat belt is being worn.

The utilization of additional, series-connected, electronic ignition switches for the respective trigger represents an expansion of the basic concept of the present invention. For example, VMOS transistors whose failure probability is already very slight are used as electronic ignition switches. The provision of further ignition switches initially produces an increase in the failure probability. This disadvantage, however, is over compensated by the testability thereby acquired. Given the presence of a plurality of ignition switches, in particular, these can be individually tested, i.e. through-tested, without causing the triggering of the air bag. An ignition switch that has become malfunctioning is recognized in the next-successive test on the basis of periodically-repeated tests and the driver is warned.

An unpredictable failure is therefore only possible in the time interval between the time an ignition switch fails and the next test, this being arbitrarily improbable given short testing intervals.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
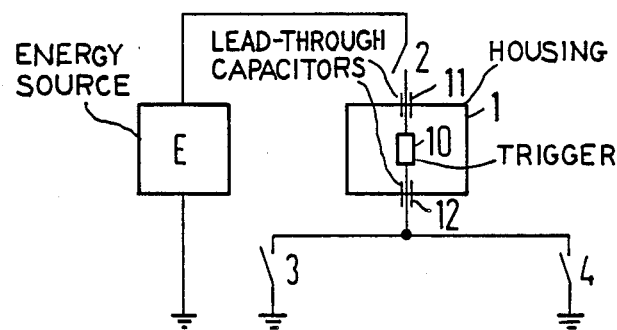
FIG. 1 is a fundamental circuit diagram of a circuit arrangement for an air bag system according to the prior art.

Referring to FIG. 1, a trigger 10 in the form of an electrically-ignitable, chemical-detonating wafer has its positive side connected to an energy source E via a switch 2 and has its ground side connected to the energy source E via parallel switches 3 and 4. The trigger 10 is seated in an air bag housing 1 and a lead-through capacitor 11, 12 is provided in its lead-in and lead-out conductors as the respective passage through the wall of the air bag housing.

The switches 2, 3 and 4 are respectively controlled via a mechanical delay sensor. The trigger 10 is actuated when the switch 2 and one of the switches 3 and 4 is closed by the respective delay sensor. The lead-through capacitors 11, 12 have one side connected to the ground of the air bag housing 1 and serve for dissipating high-frequency pick-ups on the lead-in conductor or, respectively, lead-out conductor of the trigger 10.

A switch bounce or chatter of the switch 2 does not lead to ignition when one of the switches 3 and 4 is not simultaneously closed. Thereby, however, the lead-through capacitor 11 and, via the resistor of the trigger 10, the lead-through capacitor 12, are charged. A charging current therefore flows through the trigger 10. The charging, moreover, occurs asymmetrically, due to the resistance of the trigger 10. Following the switch bounce or chatter, charge transistor events between the two lead-through capacitors 11 and 12 thereby occur, whereby current again flows through the trigger 10. Damage to the trigger 10, particularly given more frequent switch bounce or chatter of the switch 2 can therefore not be excluded.

Figure 2:
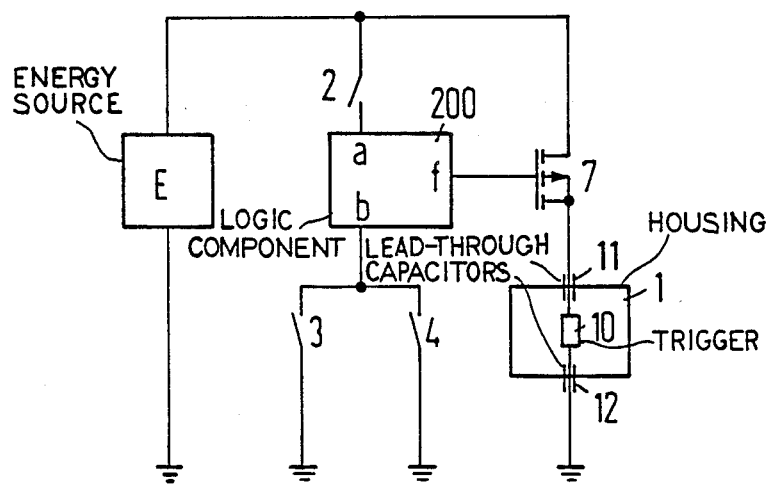
FIG. 2 is a basic circuit diagram of a circuit arrangement constructed in accordance with the present invention.

FIG. 2 illustrates a circuit arrangement constructed in accordance with the present invention wherein a switch bounce or chatter of the switch 2 plays no part. The trigger 10, as described with reference to FIG. 1, is connected to the energy source E via an ignition switch 7. Two inputs a, b, of a logic component 200 are also connected thereto, namely via the switch 2 and the switches 3 and 4, respectively.

The ignition switch 7 is a VMOS transistor whose drain is connected to the supply voltage and whose source is connected to the trigger 10. The VMOS transistor is driven by an output a of the logic component 200 via the gate of the VMOS transistor.

The switches 2, 3 and 4 therefore now serve only as control switches for the logic component 200. When the switch 2 and one of the two switches 3 and 4 is closed, then the logic component 200 is supplied with control energy via the energy source E and drives the VMOS transistor via the output f.

A switch bounce or chatter of the switch 2 now no longer plays any part since the logic component 200 is not activated without an additional closed switch 3 or 4. Since there is no switch bounce in an electronic component such as a VMOS transistor, no charging events or, respectively, charge transfer events at the lead-through capacitors 11 or 12, respectively, occur.

Figure 3:
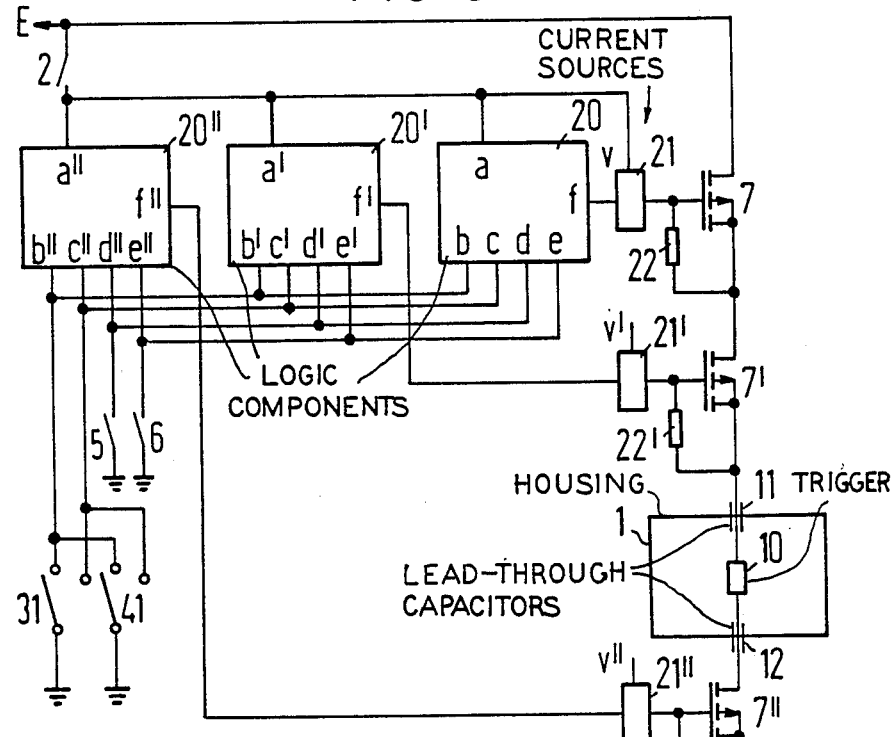
FIG. 3 is a basic circuit diagram of a circuit arrangement comprising a plurality of ignition switches, according to the present invention.

FIG. 3 illustrates the trigger 10 together with the air bag housing 1 and the lead-through capacitors 11 and 12. The trigger 10 is connected to the energy source E via three ignition switches 7, 7' and 7". One ignition switch 7" thereby lies between the trigger 10 and ground.

The ignition switches 7, 7' and 7" are driven via appertaining, identical logic components 20, 20' and 20" and current sources 21, 21' and 21". The current sources 20, 20' and 20" receive a supply voltage via supply inputs v, v' and v", each of which are connected to the energy source E via the switch 2. Further, a resistor 22, 22' and 22" is connected across the gate-source path of a respective VMOS transistor.

The structure and operation shall be presented with reference to the logic component 20. The logic component 20 has inputs a, b, c, d and e and an output f. The input a is connected to the energy source E via the switch 2. The input b is connected to a first switch contact of double switches 31 and 41 and the input e is connected to a sound switch contact of the double switches 31 and 41. When one of the double switches 31 and 41 closes on one of the two switch contacts, these are connected to ground. The input d is connected to ground via a seat switch 5 and the input e is connected to ground via a belt switch 6 when the seat is occupied or, respectively, the belt is being worn.

In this exemplary embodiment, the double switches 31 and 41 replace the switches 3 and 4. They are likewise actuated by a delay sensor (not shown) that drives the same onto the switch contact that is assigned to the input b in a first response case, the delay value lying between a first value and a second, higher limit value. In a second response case, the delay value being equal to or greater than the second limit value, the delay sensor drives the double switches 31 and 41 onto the second switch contact that is assigned to the input c.

Figure 4:
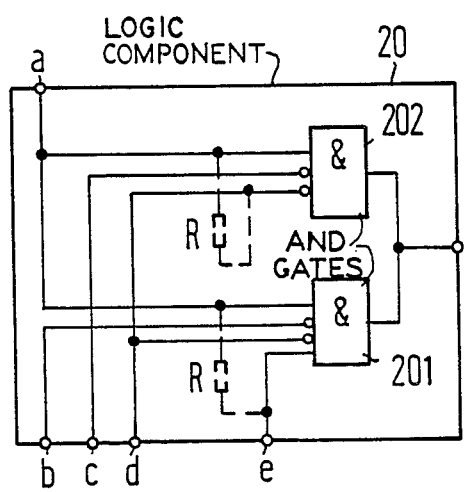
FIG. 4 is a schematic circuit diagram of an exemplary embodiment of a logic component which may be employed in practicing the present invention.

The logic operations for the switch information at the inputs a-e are accommodated in the logic component 20. An exemplary embodiment of such a logic component 20 is illustrated in FIG. 4. The logic component 20 contains two AND gates 201 and 202. The outputs of the AND gates are combined and are connected in common to an output f. The triggering should occur when a logical "1" appears at one of the two outputs of the AND gates 201 and 202. The AND gate 201 is provided for the first response case and the AND gate 202 is provided for the second response case. The four inputs of the AND gate 201 are connnected to the inputs a, b, d and e of the logic component 20. The inputs of the AND gate 201 assigned to the input b and d are negated. The three inputs of the AND gate 202 are connected to the input a, c and d of the logic component 20. Here, the inputs assigned to the inputs e and d are negated. Given open switches, the resistors R, entered in broken lines in FIG. 4, provide defined "1" signals at the inputs d, e and, therefore, at the assigned inputs of the AND gates 201 and 202.

In the first response case, the respective delay sensor closes the switch 2 and at least one of the double switches 31, 41 onto their first switch contact that is connected to the input b of the logic component 20. The AND gate 201, however, only produces a logical "1" at its output when the seat switch 5 is additionally closed and the belt switch 6 is open. The appertaining air bag is therefore not triggered when the seat is not occupied, nor is it triggered when the seat belt is being worn. In the first response case, in particular, the seat belt being worn is adequate as protection by itself.

In the second response case, the respective delay sensor closes the switch 2 and at least one of the double switches 31, 41 onto their second switch contact that is connected to the input c of the logic component 20. The AND gate 202 then produces a logical "1" at the output when the seat switch 5 is additionally closed. The position of the belt switch 6 thereby plays no part since the air bag must also be triggered in the second response case when the seat belt is being worn.

A trigger signal appears at the output f of a logic component 20 in the case of ignition. According to FIG. 3, this trigger signal is supplied to the current source 21 that, in response thereto, connects a current onto the gate of the DMOS transistor that serves as an ignition switch 7. This current also flows through the resistor 22 connected between the gate and source of the VMOS transistor and produces a voltage drop thereover that reliably through-connects the drain-source path of the VMOS transistor.

The input a'- e' or, respectively, a"-e" of the logic components 20', 20" are connected in the same manner as those of the logic component 20.

The three VMOS transistors that serve as ignition switches 7, 7', 7" are periodically tested in that they are individually driven. The two-error criterion remains met during testing as a result of the provision of three VMOS transistors, since two further VMOS transistors would have to incorrectly through-connect for a mistriggering. The drive for the test is asumed by a microprocessor (not shown) which is already present for various monitoring jobs. To this end, the microprocessor drives two bridging switches (likewise not shown) that bridge the switch 2 and one of the double switches 31, 41 so that the entire circuit is involved in the test. The test only differs from the actual ignition case in that the microprocessor respectively inhibits two of the three outputs f, f', f" of the logic components 20, 20' and 20". In each test cycle, therefore, each VMOS transistor is individually selected and measured to see that it thereby through-connects.

The fundamental circuit diagrams of FIGS. 3 and 4 represent only on exemplary circuit embodiment of a logic component 20, 20', 20" according to the invention. Instead of respectively separate logic components 20, 20', 20" for each ignition switch 7, 7', 7" , portions thereof can also be employed in common or only one logic portion 20, 20', 20" correspondingly having three outputs f, f', f" can be provided.

All possible electrical or electronic components such as, for example, a communitorial network of transistors and resistors may be considered for constructing a logic component 20, 20', 20". This job can likewise be assumed by a programmed microcomputer having an appropriate periphery.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a circuit arrangement for actuating a safety system, particularly an air bag system, which system is of the type comprising an energy source connected to at least one load system, in which the load system comprises a trigger for the safety system, in which the trigger is in a housing which is connected to a lead-in capacitor and a lead-out capacitor, and in which at least two series-connected switches are provided and each driven by a mechanical delay sensor, the improvement comprising: a logic component which is connected to the energy source by way
   of the series-connected switches; and an electronic ignition switch in the load circuit connected to and driven by said logic component.

2. The improved circuit arrangement of claim 1, and further comprising:
   at least one status switch connected to said logic component for causing the logic component to drive the electronic ignition switch dependent on the switch positions of said at least one status switch.

3. The improved circuit arrangement according to claim 1, and further comprising: at least one additional ignition switch connected in series with said ignition switch and the trigger.

* * * * *